US006210172B1

United States Patent
Clements

(10) Patent No.: US 6,210,172 B1
(45) Date of Patent: Apr. 3, 2001

(54) DO-IT-YOURSELF STORYTELLING BOOK

(76) Inventor: Jehan Clements, P.O. Box 543, Tarrytown, NY (US) 10591

( * ) Notice: Subject to any disclaimer, the term of this patent is extended or adjusted under 35 U.S.C. 154(b) by 422 days.

(21) Appl. No.: 09/017,618

(22) Filed: Feb. 2, 1998

Related U.S. Application Data

(63) Continuation-in-part of application No. 08/608,439, filed on Feb. 28, 1996, now Pat. No. 5,713,743, which is a continuation-in-part of application No. 07/951,356, filed on Sep. 25, 1992, now abandoned, which is a continuation of application No. 07/684,004, filed on Apr. 11, 1991, now abandoned.

(51) Int. Cl.$^7$ .................................................. G09B 25/00
(52) U.S. Cl. ............................ 434/428; 281/22; 281/45; 281/15.1; 281/33
(58) Field of Search ........................... 281/22, 45, 15.1, 281/33; 434/162, 317, 428

(56) References Cited

U.S. PATENT DOCUMENTS

| 131,106 | * | 9/1872 | Martin | 434/162 |
|---|---|---|---|---|
| 289,933 | | 12/1883 | Reynolds | 281/15.1 |
| 417,559 | * | 12/1889 | Horton | 434/162 |
| 1,263,664 | | 4/1918 | Hanada | 273/296 |
| 1,353,371 | | 9/1920 | Winslow | 283/63.1 |
| 1,385,623 | | 7/1921 | Kellogg | 434/347 |
| 1,405,134 | | 1/1922 | Hoyme | 434/178 |
| 1,563,582 | | 12/1925 | McDade | 434/178 |
| 2,034,059 | * | 3/1936 | Salsman | 281/33 |
| 2,315,396 | * | 3/1943 | Buckland et al. | 281/33 |
| 2,433,540 | | 12/1947 | Wright | 446/73 |
| 2,544,568 | | 3/1951 | Shepherd | 283/63.1 |
| 2,867,917 | | 1/1959 | Carlton | 434/178 |
| 3,028,178 | * | 4/1962 | Pietrangeli | 281/16 X |
| 3,091,482 | | 5/1963 | Cirgliano | 281/33 |
| 3,166,342 | * | 1/1965 | Yerkes | 281/33 |
| 3,263,347 | | 8/1966 | McCutcheon | 434/430 |

(List continued on next page.)

Primary Examiner—Valencia Martin-Wallace
Assistant Examiner—Chanda Harris
(74) Attorney, Agent, or Firm—Milbank, Tweed, Hadley & McCloy LLP

(57) ABSTRACT

A storytelling book with clear loose-leaf page holders is provided so that a person, such as a child, can illustrate and narrate with text a story of his or her own invention on a series of insertion pages and then present that story to an audience. A selected number of pages comprising the insertion pages created by the storyteller, and corresponding insertion pages, are arranged in book-like fashion and bound together so that the book may be disposed either with the pages flat on a support or in easel-like disposition. A first side of one of the pages is disposed in proximity to a second side of an adjacent page when the book-like arrangement is in a closed condition. The pages are disposed so that the person listening to the story sees the first sides and their respective illustrations or pictures while the storyteller or reader sees the second page sides and their corresponding text.

20 Claims, 3 Drawing Sheets

U.S. PATENT DOCUMENTS

| | | | |
|---|---|---|---|
| 3,270,449 | * 9/1966 | Robbie | 40/102 |
| 3,417,490 | 12/1968 | Chuy | 434/331 |
| 3,450,420 | * 6/1969 | Smith | 281/33 |
| 3,562,923 | 2/1971 | Chuy | 434/331 |
| 3,638,332 | * 2/1972 | Jones | 434/162 |
| 3,720,130 | * 3/1973 | Holson | 40/104.18 |
| 3,738,686 | 6/1973 | Morse | 283/63 |
| 3,939,588 | * 2/1976 | Hockaday | 40/1.5 |
| 4,231,174 | * 11/1980 | Thompson | 40/10 |
| 4,262,422 | * 4/1981 | Pass | 33/41.2 |
| 4,268,256 | * 5/1981 | Moskowitz | 434/162 |
| 4,419,080 | 12/1983 | Erwin | 434/172 |
| 4,487,431 | * 12/1984 | Kelly | 283/1 |
| 4,515,566 | 5/1985 | Sprague | 434/172 |
| 4,603,995 | * 8/1986 | Vilona | 402/73 |
| 4,606,554 | * 8/1986 | Lederman | 281/15 |
| 4,626,219 | * 12/1986 | Goldreyer | 434/162 |
| 4,877,269 | 10/1989 | Callaghan et al. | 283/40 |
| 4,950,167 | 8/1990 | Harris | 434/322 |
| 5,025,581 | * 6/1991 | Polzin | 40/159 |
| 5,033,964 | 7/1991 | Phelps | 434/113 |
| 5,102,338 | * 4/1992 | Kapiloff | 434/162 |
| 5,161,907 | * 11/1992 | Byrne | 402/4 |
| 5,306,155 | * 4/1994 | Koke | 434/410 |
| 5,520,544 | * 5/1996 | Manico et al. | 434/317 |
| 5,551,878 | * 9/1996 | Ellenbogen | 434/165 |
| 5,569,503 | * 10/1996 | Pietroski | 428/41.8 |
| 5,586,786 | * 12/1996 | Su | 281/33 X |
| 5,626,365 | * 5/1997 | Petteway | 281/15.1 |
| 5,713,551 | * 2/1998 | Doerner | 248/441.1 |
| 5,713,743 | * 2/1998 | Clements | 434/428 |
| 5,715,618 | * 2/1998 | Whang | 40/119 |
| 5,752,721 | * 5/1998 | Balbas | 281/19.1 |
| 5,772,247 | * 6/1998 | Legrand | 281/31 |
| 5,791,692 | * 8/1998 | Manico et al. | 283/67 |
| 5,816,730 | * 10/1998 | Alspaw et al. | 402/79 |
| 5,836,614 | * 11/1998 | Park | 281/16 X |

* cited by examiner

DO-IT-YOURSELF STORYTELLING BOOK

REFERENCE TO RELATED APPLICATIONS

This application is a continuation-in-part of U.S. application Ser. No. 08/608,439 filed Feb. 28, 1996, now U.S. Pat. No. 5,713,743, which is a continuation-in-part of U.S. application Ser. No. 07/951,356 filed Sep. 25, 1992, now abandoned, which is a continuation of U.S. application Ser. No. 07/684,004 filed Apr. 11, 1991, now abandoned. All of these related applications are hereby incorporated by reference.

BACKGROUND OF THE INVENTION

This invention relates to books and the like; and more particularly, to books and the like utilized by a person or persons to tell or relate a story to another person or group of persons. In particular, this invention relates to a "do-it-yourself" storytelling book which allows a parent, child or teacher to create their own storytelling book which is specially adapted to allow the creator to relate a story to another person or group of persons.

Many people read stories from books to other people; or tell or describe a story that may be illustrated in a book to one or more other people. Quite often the listener or person or persons to whom the story is being told or read is relatively young, maybe too young to know how to read; and the storyteller or reader is older, possibly a parent, older sibling or relative, or a teacher. There are many reasons to tell stories and/or read to young children. Storytelling and reading serve to occupy the child's time and facilitate teaching the child to recognize letters, words, objects, persons, places, colors, things and the like. In time, storytelling and reading will help the child learn to read themselves and to develop an imagination. Once this facility is developed, a child may want to create his or her own storytelling book.

Thus, books and other things may often combine graphic illustrations, in color in many instances, and related words to provide a more interesting experience for the young child. Even toys, such as that shown in U.S. Pat. No. 2,433,540 issued on Dec. 30, 1947 to J. H. Wright for *Humpty Dumpty Break-Up Toy* may be formed graphically and with words. However, such relatively bulky items are more suitable to hand-type game activity than to person-to-person storytelling and may, in fact, distract the child to whom the story is being read or told and thus interfere with the reading or storytelling. Graphics and words are also combined on cards to provide a learning experience in an interactive setting. The *Game Cards* of U.S. Pat. No. 1,263,664 issued on Apr. 23, 1918 to T. E. Hanada, for example, shows sets of game cards with pictures of persons on one side of the card and sayings on the other side of the card related to the person pictured on the card. However, cards quite often get separated from the deck, and possibly lost and are often not in any predetermined order. Thus, such card games are not suitable for book type reading and/or storytelling.

It is also known to associate a set of cards with a device or machine so that one person may successively or otherwise display the cards for viewing by another person, usually in a testing situation. However, such arrangements, as shown for example in U.S. Pat. No. 1,385,623 issued on Jul. 26, 1921 to J. L. Kellogg for *Kindergarten Apparatus;* in U.S. Pat. No. 3,417,490 issued on Dec. 24, 1968 to R. G. Chuy et al for *Flash Card Apparatus;* in U.S. Pat. No. 3,263,347 issued on Aug. 2, 1966 to L. A. McCutcheon for *Educational And Recreational Lesson-Aids And Games With Easel;* and in U.S. Pat. No. 3,562,923 issued on Feb. 16, 1971 to R. G. Chuy et al for *Educational Aid Viewing Apparatus,* require the use of both a set of cards and a machine or device to position and move the cards and thus add to the cost and complexity of utilizing the cards and also present cards which do not tell a story or facilitate telling a story and do so in an environment which is not necessarily conducive to story telling or reading.

Flash card type arrangements are also provided for use in book form as well as the device and machine set-ups described above. One such book form use is shown and described in U.S. Pat. No. 4,950,167 issued on Aug. 21, 1990 to J. A. Harris for *Visual Detail Perception Test Kit And Methods Of Use* wherein cards, or large pages, are mounted in a loose-leaf type binder so that one viewer, in this case a tester, can utilize the indicia on one page while the other viewer, the testee, can utilize the indicia on the corresponding next, opposite, or facing page. While the indicia on each set of cooperating pages in the Harris test kit are related, they do not show, teach or even suggest a story that is to be read by one party to another. The Harris test kit is just that; a test kit and nothing more. Similarly, the Woodcock-Johnson Psycho-Educational Battery by Teaching Resources Corporation utilizes a bound book-type holder for successive cards or pages so as to present a first page with a graphic and a related but incomplete sentence to a test taker and a second page with a substantially identical graphic and the same incomplete sentence to a tester and with teaching aids on the testers page. This test kit is also a compilation of separate and distinct two-page sets—each presenting a test but not cooperating with each other to do any more than present separate and distinct test sets.

U.S. Pat. No. 1,563,582 issued on Dec. 1, 1925 to J. E. McDade for *Silent Reading Story Illustrating Arrangement* presents a storybook and related base upon which a party, the listener or reader, may set up graphics related to the story of the book. The McDade device thus requires a book, a number of cut-outs and a base constructed to receive the cut-outs. The arrangement is relatively cumbersome and bulky, and the cut-outs may be easily lost. In U.S. Pat. No. 1,405,134 issued on Jan. 31, 1922 to C. R. Hoyme for *Book* there is shown a bound book with printed text on one page and an open top pocket on the facing page. A cut-out illustration is received in the pocket. Here again, the cut-out illustration, being separate and relatively thick to facilitate its removal from the pocket for use, may be lost thus defeating the purpose of book text and illustration. In addition, the relative thickness of the illustration and its pocket renders the book relatively thick and bulky for a given size story. In addition, neither the McDade book nor the Hoyme book are conducive for easy storytelling and reading by one person, preferably an adult, to another person or a young child. More importantly, the removal of items from the Hoyme book and the setting up of the McDade Scene may so distract the listener as to exasperate the storyteller or reader.

Similarly, while certain of the kits and books known in the prior art have separate cards as part of the overall apparatus, none of this prior art shows arranging a series of pages by insertion in a loose-leaf-type holder in such a fashion that a parent, child or teacher can create his or her own storytelling book which is specially adapted to allow the creator to relate a story to another person or group of persons.

SUMMARY OF THE INVENTION

It is therefore an object of this invention to provide a new and improved storytelling aid.

It is another object of this invention to provide a new and improved reading aid.

It is yet another object of this invention to provide a new and improved storytelling book.

It is still another object of this invention to provide a new and improved storytelling and reading book.

It is yet still a further object of this invention to provide a new and improved storytelling and reading aid in wire, spiral or loose-leaf bound book form that facilitates reading or telling of a story to a young child by an older person.

It is an additional object of this invention to provide a new and improved storytelling and reading aid which allows a parent, child or teacher to create their own storytelling book which is specially adapted to allow the creator to relate a story to another person or group of persons Other objects, features and advantages of the invention in its details of construction and arrangement of parts will be seen from the above, from the following description of the preferred embodiment when considered with the drawing and from the appended claims.

BRIEF DESCRIPTION OF THE DRAWINGS

In the drawings, in which like reference numerals refer to like-parts throughout.

DESCRIPTION OF THE PREFERRED EMBODIMENT

For convenience, there is generally shown a book with a number of leaves or pages upon a number of which is graphically printed and illustrated a story, usually without words, and upon a corresponding number of which is printed the graphics of the story and text related to the story and the telling of the story. The book is bound by a plastic spine to facilitate the easy turning of the leaves or pages and the standing up of the book in easel-like configuration and also to facilitate reading and telling of the story and use of the book. It should be understood, nevertheless, that other forms of reproduction of the graphics and text besides printing may be utilized, that the book may be bound together by wire, plastic, rings or other suitable and appropriate means that facilitate turning of the pages and that the book may be utilized flat down as well as in easel-like configuration.

Figure 1:
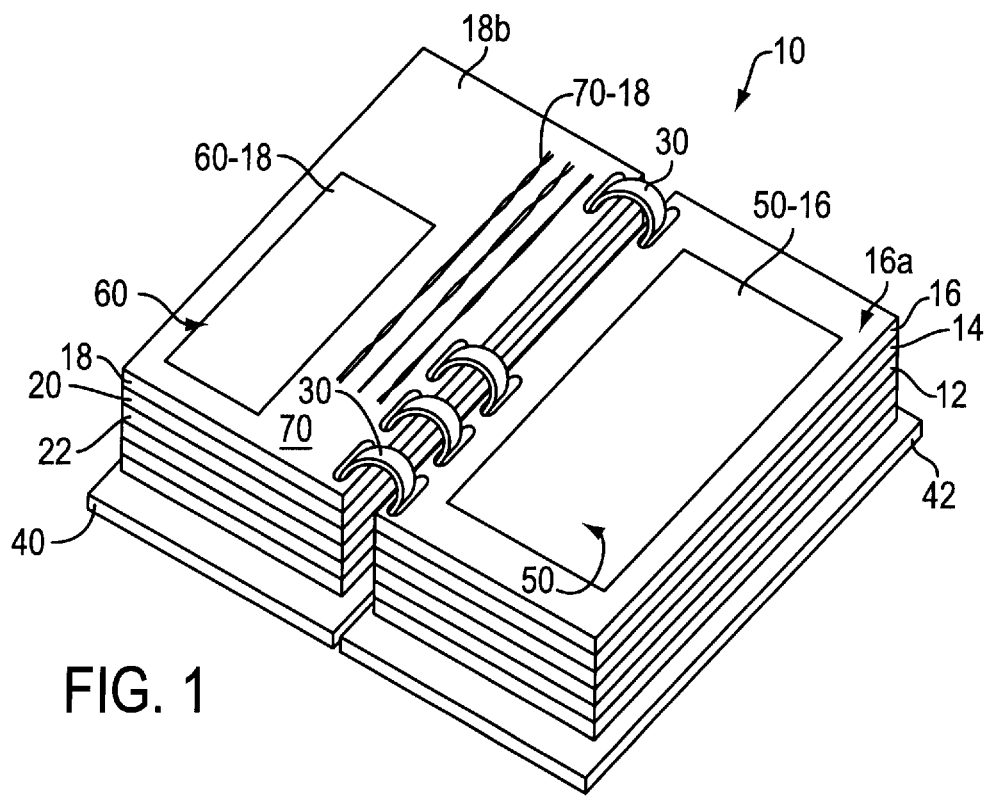
FIG. 1 is a perspective schematic of a storytelling book incorporating the instant invention.
Figure 2:
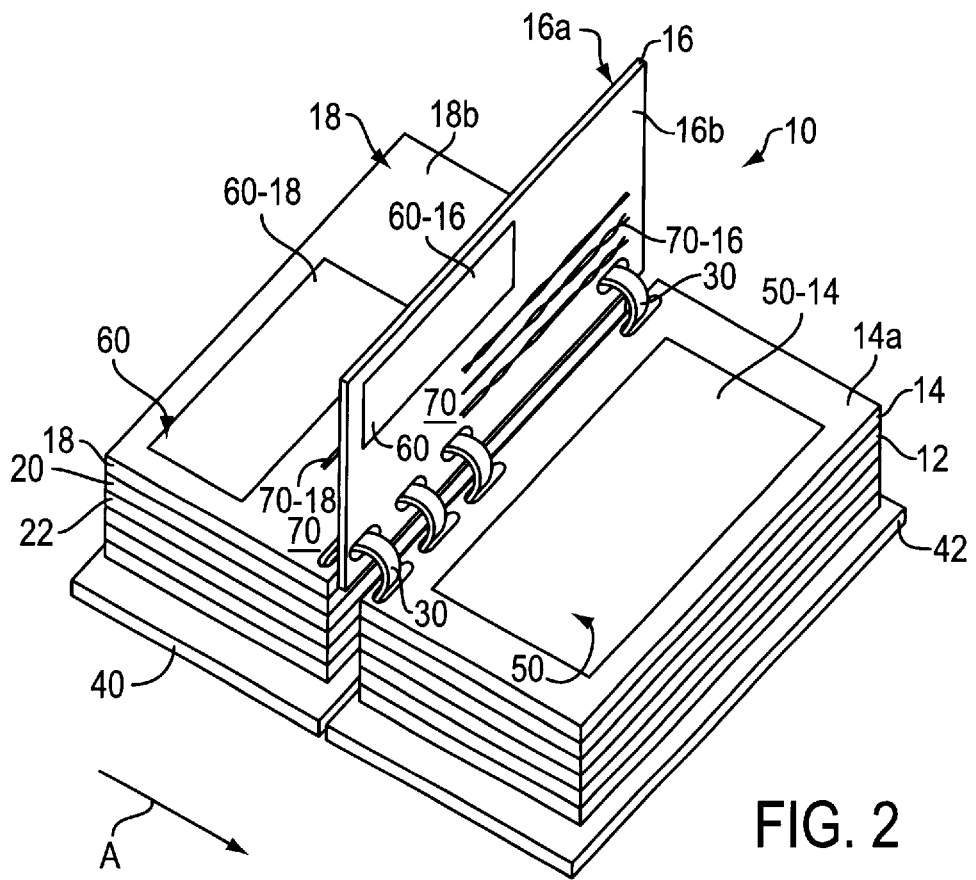
FIG. 2 is a perspective schematic of the storytelling book of FIG. 1 showing a page or leaf thereof being turned.
Figure 3:
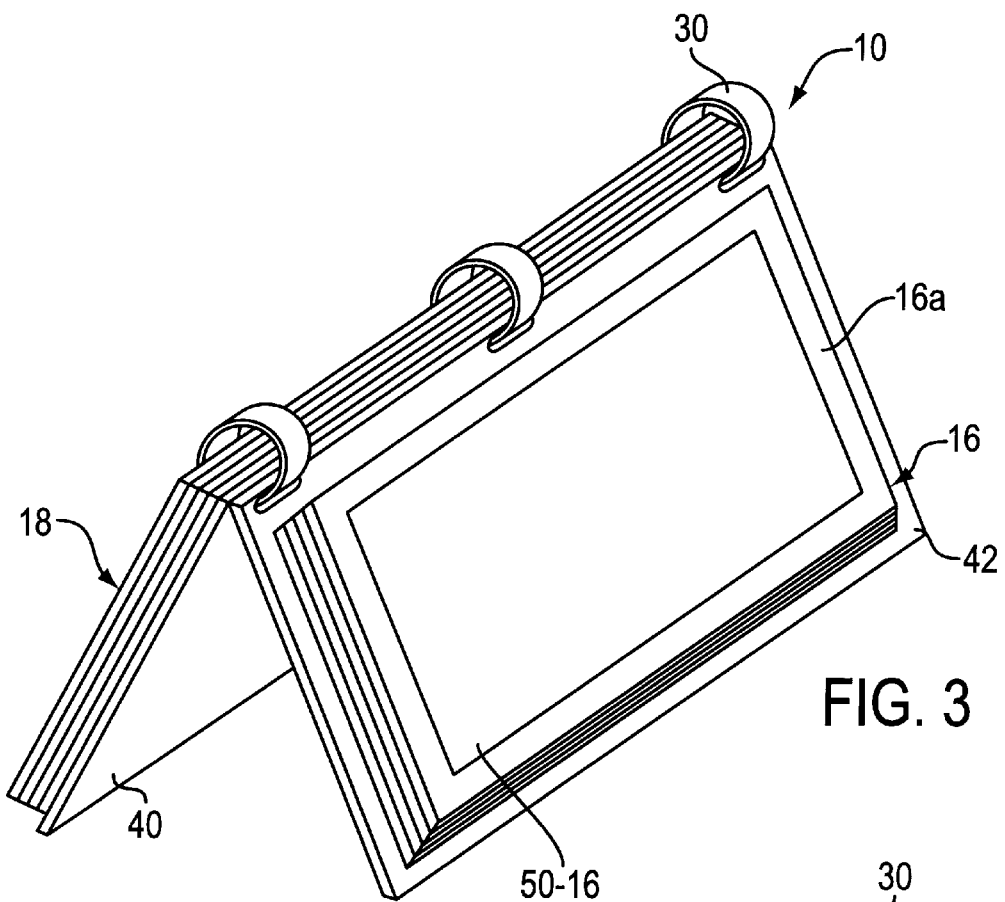
FIG. 3 is a perspective view of the storytelling book of FIGS. 1 and 2 showing same set up for use, in easel-like configuration, and showing the page facing the audience.
Figure 4:
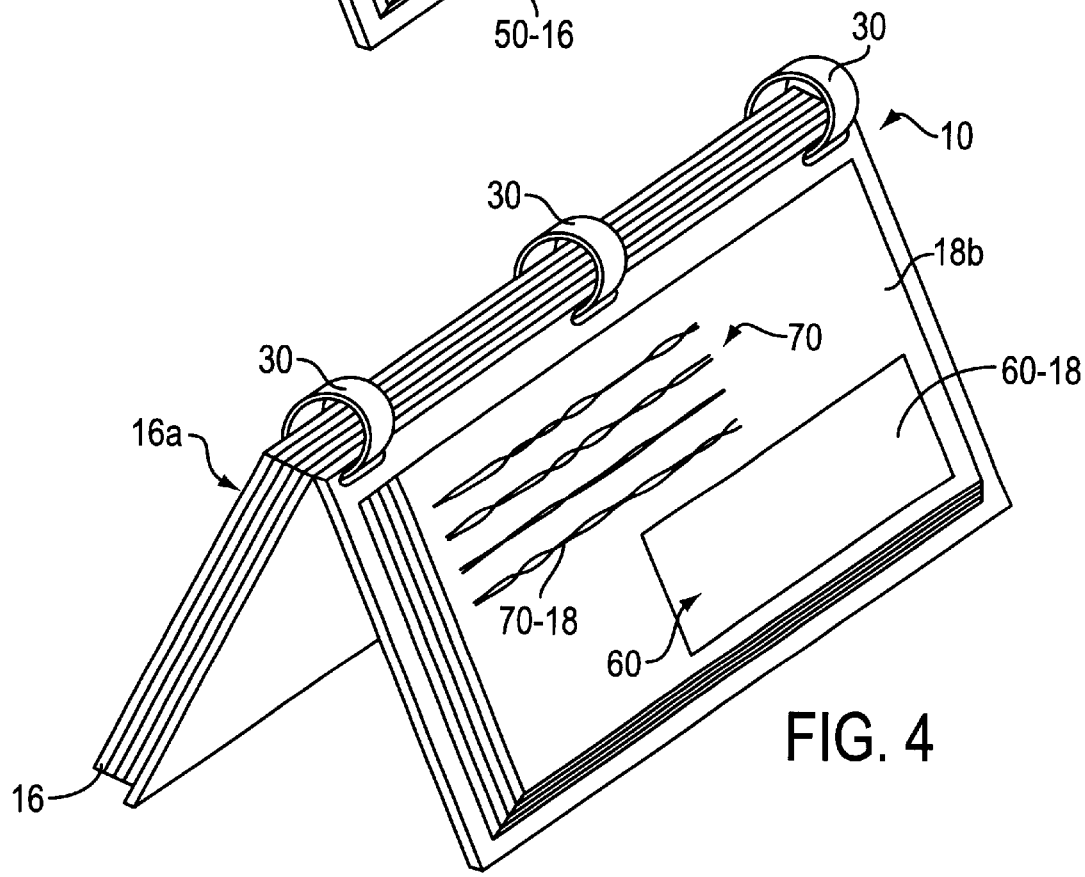
FIG. 4 is a perspective view of the storytelling book of FIGS. 1–3 showing the same set up for use, in easel-like configuration, and showing the storyteller's or reader's page.

With reference to FIGS. 1–6 there is generally shown at 10 a storytelling book incorporating the instant invention. Book 10 includes a plurality of leaves or pages 12, 14, 16, 18, 20, 22, etc., conventionally bound together as by conventional plastic loops 30 carried by a spine and in a manner that facilitates turning of pages 12–22 as well as the disposition of book 10 in either a flat configuration, as shown in FIGS. 1 and 2, or in an easel-like configuration, as shown in FIGS. 3 and 4. A front cover 40 and a back cover 42 may be provided for book 10. Covers 40, 42 may be of the same stock as that of pages 12–22 or of different stock and may be of the same size as page 12–22 or slightly larger as conventionally done for many books.

Figure 5:
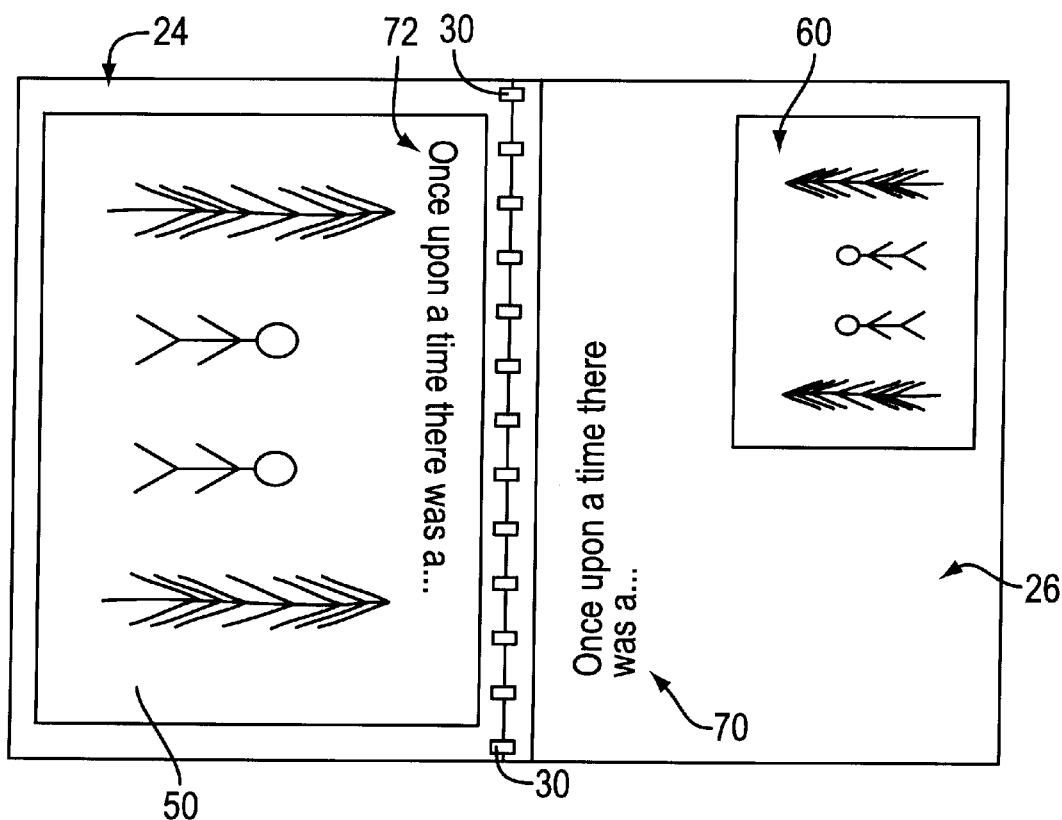
FIG. 5 is a perspective view of the storytelling book of FIGS. 1–4 showing the same laid flat, and showing both the page facing the storyteller and the page facing the audience, and showing textual material disposed across the latter page.

Pages 12–22 each include a first or facing side 12a, 14a, 16a, 18a, 20a, 22a, 24a, 26a etc., (side 14a shown in FIG. 2, side 16a shown in FIGS. 1, 2, 3 and 4 and side 24a shown in FIGS. 5 and 6) and a second or back side 12b, 14b, 16b, 18b, 20b, 22b, 24b, 26b, etc., (side 16b shown in FIG. 2, side 18b shown in FIGS. 1, 2, 3 and 4 and side 26b shown in FIG. 5). Each "a" side includes a graphic or illustration 50 illustrating a portion of a story with the set of "a" sides 50-12, 50-14, 50-16, 50-18, 50-20, 50-22, etc., together and successively illustrating the story; preferably without words or printed text. Each "b" side includes a graphic or illustration 60 forming a set 60-12, 60-14, 60-16, 60-18, 60-20, 60-22, etc., with the graphics or illustrations 60 being identical, or closely corresponding, to the facing page graphic or illustration 50. Graphics or illustrations 60 are preferably of a proportionally reduced size to graphics or illustrations 50. Thus graphic 60-18 is most preferably identical to graphic 50-16 (FIG. 1) but of a reduced size and graphic 60-16 is most preferably identical to graphic 50-14 (FIG. 2), etc.

Graphics or illustrations 50 are preferably sized to encompass substantially their entire page and are preferably in color but may be in black and white, or otherwise, as long as graphics 50 depict the intended story and do so in successive panels in the sequence of the story to be told or read. Graphics or illustrations 60 are identical or closely corresponding to their respective and corresponding graphics 50 as described above, are disposed on a facing page to their corresponding graphic 50 (in the closed condition of storytelling book 10), are preferably sized smaller than the corresponding graphics 50 and are preferably disposed in the center of the respective pages or the lower right quadrant of their respective pages as shown in FIG. 4. The pages carrying graphics 60 also carry textual material 70 as shown at 70-18 (FIGS. 1, 2 and 4) and at 70-14 (FIG. 2). Textual material 70 may constitute the portion of the story corresponding to the corresponding graphics [i.e. 70-16 corresponds and relates to 60-16 and 50-14 (FIG. 2) and 70-18 corresponds and relates to 60-18 and 50-16 (FIG. 1)]. Textual material 70 is preferably disposed above graphic 60 across the top of the page and preferably starts in the upper left quadrant of the page as looked at by the reader. Such textual material 70 may extend across the top of graphic 60 and if desired along its side. In addition textual material 70 may include questions for the listener pertinent to the story line to assist the reader or storyteller or other pertinent material or information for the reader or storyteller.

Additional pages may be bound into book 10 by binding 30 and other information, textual material, questions, hints, aids and the like included thereon.

In use the storyteller or reader preferably places book 10 in easel-like configuration (FIGS. 3, 4 and 6) with page sides "a" containing the full page graphics or illustrations 50 facing the listener. As such page sides "b" containing the corresponding reduced size graphics or illustration 60 will face the storyteller or reader as will the corresponding textual material 70. The reader or storyteller then starting at the beginning (say page 12) will begin the story with page 12a and graphic 50-12 facing the listener and page 14b, graphic 60-14 and text 70-14 facing the reader. Graphic 60-14 and text 70-14 will correspond to graphic 50-12 and the storyteller can start the story. The storyteller will then proceed and turn page 14 in the direction of arrow "A" about binder 30 until it is disposed with its side 14b against side 12a (FIG. 2) and will read text 70-16 while observing graphic 60-16 and while the listener looks at graphic 50-14. Upon turning page 16 (in the direction of arrow "A" FIG. 2) graphic 50-16 will be disposed to face the listener (FIG. 3) and graphic 60-18 (FIG. 4) and textual material 70-18 will face the storyteller or reader. This disposition, where the reader and the audience can each see the material on the page sides facing of them in the proper orientation for reader and viewing, respectively, is known as "diametric contraposition." The storyteller or reader thus continues until the story and related questions and other text material 70 are finished.

If desired, book 10 may be used as described above but with its pages flat on a surface as shown in FIGS. 1 and 2. Book 10 may also be used held in the lap of the reader, with page sides "b" facing up for reading and page sides "a" hanging down over the knees of the reader and thus facing the audience.

From the above description it will thus be seen that there has been shown and described a new and improved storytelling book which permits the listener to observe graphic illustrations of each successive portion of a story while presenting to the storyteller or reader the same or corresponding graphics but on a reduced scale accompanied by related text.

Figure 6:
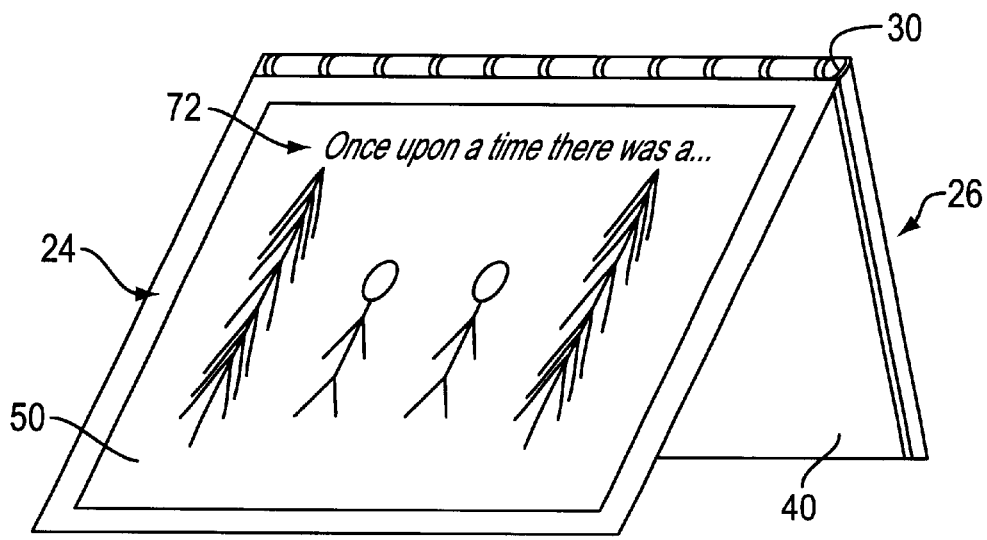
FIG. 6 is a perspective view of the storytelling book of FIGS. 1–5 showing the same set up for use, in easel-like configuration, and showing the page facing the audience with textual material disposed thereon.

There is an educational technique that requires the placement of text and corresponding picture from a story, in close proximity on the same page, so that an audience of listeners may see the picture and also see text that is identical to, or related to, the text being read out loud to them by a reader. The present invention also encompasses a storytelling book reflecting this technique As can be seen in FIGS. 5 and 6, textual material 72 is disposed across page 24a with graphic 50-24 facing the listener and page 26b, graphic 60-26 and text 70-26 facing the reader. Graphic 60-26 and text 70-26 will correspond to graphic 50-24. Any combination of pictures and text on the page facing the audience is within the scope of the present invention so long as an identical or closely corresponding picture, and a predetermined amount of text corresponding to the reader's picture, are on the page facing the reader. The text on the page facing the audience may, but need not, be identical to the text facing the reader. Similarly, the picture on the page facing the reader may, but need not, be of smaller size than the picture on the adjacent page facing the audience As used herein, the term "picture" encompasses any type of graphics or illustration, or other forms of visual media, which is preferably but not necessarily without words or printed text. There is another educational technique in which a person, preferably a child, creates his or her own story and relates that story to an audience. The present invention encompasses a storytelling book adapted for use with this technique. In a most preferred embodiment, the storytelling book is a teacher's aid especially designed for use in a classroom by students, when they are producing a single copy of an original story. The storytelling book of the present invention adapted for use with this educational technique facilitates the educational process of writing, illustrating, designing, and then reading out loud a story created by the student.

In such a storytelling book, rather than permanent pages, book 10 is provided with page holders to hold original insertion pages created by the storyteller. These page holders can be of any design (e.g., substantially clear loose-leaf envelopes open at the edges perpendicular to loops 30; or even a blank surface directly bound by loops 30 to which the insertion pages can be affixed), so long as the original and corresponding insertion pages (created as described below) are in diametric contraposition. The clear loose-leaf page holders may contain a stiff opaque insert to maintain their shape and provide a background for the insertion pages, as described below.

In accordance with this storytelling educational technique, a person illustrates a story of his or her own invention on a series of original insertion pages. Each successive original insertion page contains at least one picture, and possibly some text. These original insertion pages can be created by hand or using graphical programs on a computer, as is well known. If created by hand, the storytelling book may be most preferably provided with an original insertion page which is blank except for a border outlining a space and the instructions "Draw a picture from your story in this space" noted in parentheses at the top. If created by computer, one computer program useful for creating these original insertion pages is "Storybook Weaver" from The Learning Company of Minneapolis, Minn. The insertion pages are preferably one-sided for use with clear loose-leaf holders having a stiff opaque insert, as explained below.

In order to create a storytelling book in accordance with the invention, a corresponding insertion page having a picture, and preferably some text as well, corresponding to the picture on the original insertion page is generated either manually or mechanically (e.g., using a photocopier or a graphical computer program). This step of generating a series of corresponding insertion pages having corresponding pictures and text is most preferably done by having the creator of the story write the text on a corresponding lined insertion page provided with the book. Most preferably, this lined corresponding insertion page has two columns of dotted lines with the instructions "Write your story using these lines" noted in parentheses at the top of the page. On this lined corresponding insertion page, a space without lines is provided in the lower right-hand corner with the instructions, "Paste a reduced size copy of your picture here" noted in the space. A reduced-size picture corresponding to the picture on the original insertion page may be created either manually or mechanically, and then pasted in the indicated space. Alternatively, the corresponding picture may be of any size, and may be considered the corresponding insertion page itself.

As illustrated in FIGS. 1 and 2, original insertion page 16a has a picture which corresponds to the picture (and text, if included) on corresponding insertion page 18b. Similarly, the picture on original insertion page 14a corresponds to the picture (and text) on corresponding insertion page 16b, etc. These insertion pages are then preferably inserted in clear loose-leaf holders provided in book 10 in diametric contraposition to a create a plurality of pages 12, 14, 16, 18, 20, 22, so that the original and corresponding insertion pages form "a" and "b" sides of the pages of book 10. Alternatively, the original and corresponding insertion pages may simply be affixed to a blank background surface which is provided in book 10 to form pages. The new story, thus arranged in a "do-it-yourself" storytelling book, can then be related to an audience by the creator of the story or by another person, such as a teacher or parent. During storytelling, either the original versions or the corresponding versions of the pictures and/or text can face the narrator of the story.

It is understood that although there has been shown and described a preferred embodiment of the invention that various modifications may be made in the details thereof without departing from the spirit as comprehended by the following claims.

What is claimed is:

1. The method of creating and preparing a story to be read to a person or persons forming an audience comprising:
   a) providing a storytelling flip-over picture book;
   b) providing said book with a plurality of page holders;
   c) providing binder means for binding the plurality of page holders in an easel-like arrangement;
   d) providing at least two original insertion pages which have a space for pictures illustrating a story;
   e) creating pictures on said two original insertion pages;
   f) providing at least two corresponding insertion pages;
   g) generating on said two corresponding pictures corresponding to the pictures on said original insertion pages;
   h) creating book pages by holding said original insertion pages and said corresponding insertion pages using said page holders such that said original and corresponding insertion pages are arranged in diametric contraposition.

2. The method as recited in claim 1 wherein said page holders are substantially clear loose-leaf envelopes having a stiff opaque insert.

3. The method as recited in claim 1 wherein said pictures are created using a graphical computer program.

4. The method as recited in claim 1 wherein the pictures on said original insertion pages are created by hand.

5. The method as recited in claim 4 wherein said original insertion pages are blank except for a border outlining a space and the instructions "Draw a picture from your story in this space" noted in parentheses at the top.

6. The method as recited in claim 1 wherein said step of generating at least two corresponding pages includes having the creator of the story write text on corresponding insertion pages having lines provided with the book.

7. The method as recited in claim 6 wherein said corresponding insertion pages each have two columns of dotted lines with the instructions "Write your story using these lines" noted in parentheses at the top of the pages.

8. The method as recited in claim 7 wherein said corresponding lined insertion pages each have a space without lines in the lower right-hand corner with the instructions, "Paste a reduced size copy of your picture here" noted in the space.

9. The method as recited in claim 1 wherein the pictures on said corresponding insertion pages are reduced-size copies of the pictures from said original insertion pages.

10. The method as recited in claim 1 wherein said story is read to an audience by the creator of the story.

11. A storytelling flip-over picture book of the type wherein a reader reads from the book to at least one other person as an audience of the reader, said book comprising:
    a) a plurality of page holders;
    b) binder means for binding the plurality of page holders in an easel-like arrangement;
    c) at least two original insertion pages which have pictures illustrating a story;
    d) at least two corresponding insertion pages having pictures corresponding respectively to the pictures on said original insertion pages;
    wherein book pages are created by holding said original insertion pages and said corresponding insertion pages using said page holders such that said original and corresponding insertion pages are arranged in diametric contraposition.

12. The book of claim 11 wherein said page holders are substantially clear loose-leaf envelopes having a stiff opaque insert.

13. The book of claim 11 wherein said pictures are created using a graphical computer program.

14. The book of claim 11 wherein the pictures on said original insertion pages are created by hand.

15. The book of claim 11 wherein said original insertion pages are blank except for a border outlining a space and the instructions "Draw a picture from your story in this space" noted in parentheses at the top.

16. The book of claim 11 wherein the creator of the story writes text on corresponding insertion pages having lines provided with the book.

17. The book of claim 16 wherein said corresponding lined insertion pages each have two columns of dotted lines with the instructions "Write your story using these lines" noted in parentheses at the top of the pages.

18. The book of claim 17 wherein said corresponding lined insertion pages each have a space without lines in the lower right-hand corner with the instructions, "Paste a reduced size copy of your picture here" noted in the space.

19. The book of claim 11 wherein the pictures on said corresponding insertion pages are reduced-size copies of the pictures from said original insertion pages.

20. The book of claim 11 wherein the reader also created the pictures illustrating the story.

* * * * *